(12) United States Patent
Yasumura

(10) Patent No.: US 6,687,137 B1
(45) Date of Patent: Feb. 3, 2004

(54) RESONANT SWITCHING POWER SUPPLY CIRCUIT WITH VOLTAGE DOUBLER OUTPUT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/030,839
(22) PCT Filed: May 10, 2000
(86) PCT No.: PCT/JP00/02995
§ 371 (c)(1), (2), (4) Date: Jun. 3, 2002
(87) PCT Pub. No.: WO01/86794
PCT Pub. Date: Nov. 15, 2001

(51) Int. Cl.⁷ .............................................. H02M 3/335
(52) U.S. Cl. ..................... 363/21.01; 363/97; 363/21.02
(58) Field of Search ............................. 363/18, 19, 20, 363/21.01, 21.02, 21.03, 21.04–21.18, 95, 97

(56) References Cited

U.S. PATENT DOCUMENTS

| 3,828,239 A | 8/1974 | Nagai et al. ................... 363/20 |
| 4,833,581 A | 5/1989 | Ishiyama ...................... 363/20 |
| 6,407,934 B1 * | 6/2002 | Ishii et al. ................ 363/21.04 |
| 6,515,875 B2 * | 2/2003 | Yasumura ................ 363/21.02 |

FOREIGN PATENT DOCUMENTS

| JP | 50-28620 | 9/1975 |
| JP | 63-198286 | 8/1988 |
| JP | 8-10629 | 1/1996 |
| JP | 8-66034 | 3/1996 |
| JP | 8-107671 | 4/1996 |
| JP | 8-294281 | 11/1996 |
| JP | 10-210745 | 8/1998 |
| JP | 2000-125551 | 4/2000 |

OTHER PUBLICATIONS

Patent Abstracts of Japan, 2000–125551, Apr. 28, 2000, vol. 2000, No. 07 dated Sep. 29, 2000.
Patent Abstracts of Japan, 08 107671, Apr. 23, 1996, vol. 1996, No. 08 dated Aug. 30, 1996.
Patent Abstracts of Japan, 08 294281, Nov. 5, 1996, vol. 1997, No. 03 dated Mar. 31, 1997.
Patent Abstracts of Japan, 08 066034, Mar. 8, 1996, vol. 1996, No. 07 dated Jul. 31, 1996.
Patent Abstracts of Japan, 10 210745, Aug. 7, 1998, vol. 1998, No. 13, dated Nov. 30, 1998.

* cited by examiner

*Primary Examiner*—Jessica Han
(74) *Attorney, Agent, or Firm*—Frommer Lawrence & Haug LLP; William S. Frommer

(57) ABSTRACT

A switching power supply circuit includes an insulating converter transformer where the insulating converter transformer has a gap formed therein so that a coupling which is efficient for a loose coupling is obtained; switching circuit, a primary side parallel resonance circuit formed from a leakage inductance component from the primary winding of the insulating converter transformer and a capacitance of a parallel resonance capacitor and a secondary side series resonance circuit including a secondary side series resonance capacitor and a secondary winding of the insulating converter transformer; a dc output voltage production means for performing a voltage multiplying full-wave rectification operation to produce a secondary side dc output voltage substantially equal to twice the input voltage level; and a constant voltage control means for varying a switching frequency of the switching element in order to perform constant voltage control of the secondary side output voltage.

9 Claims, 13 Drawing Sheets

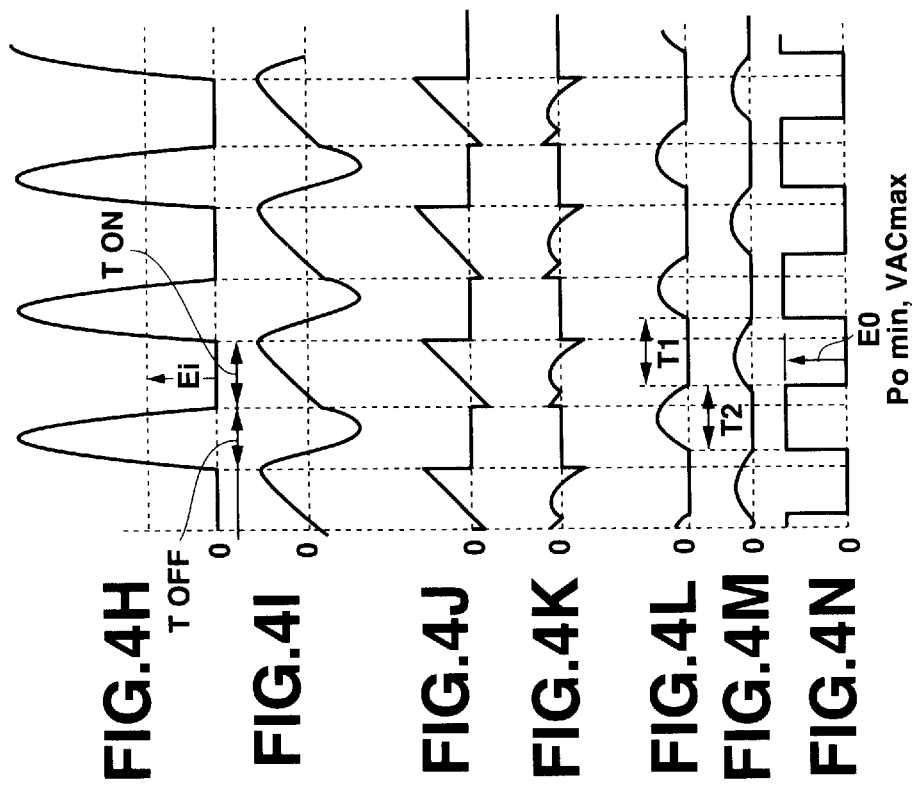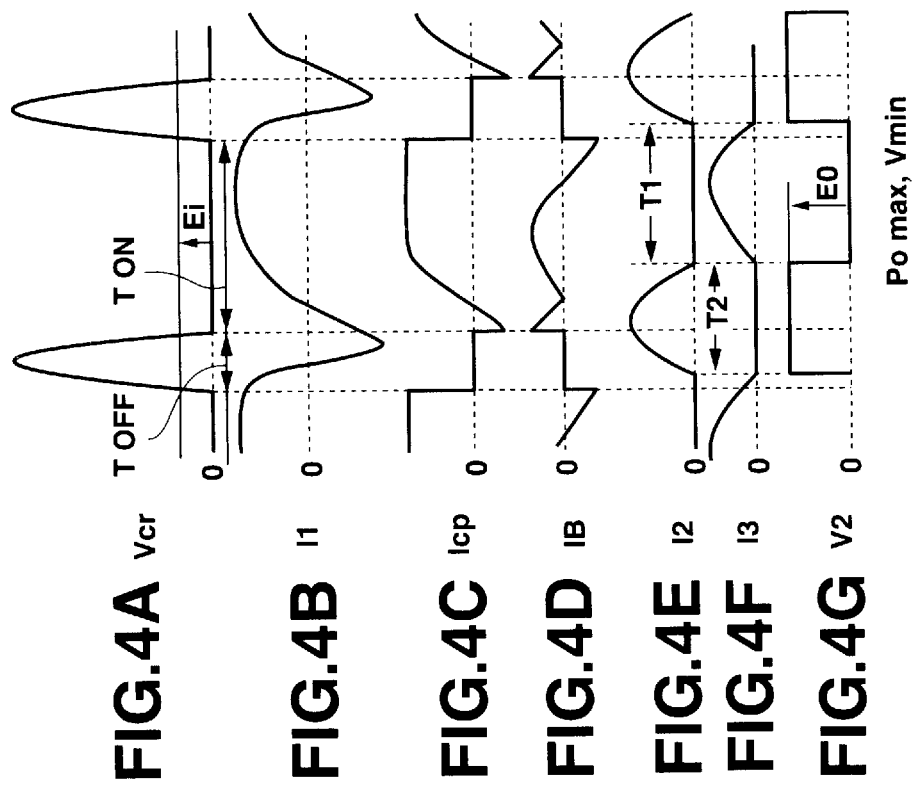

RESONANT SWITCHING POWER SUPPLY CIRCUIT WITH VOLTAGE DOUBLER OUTPUT

TECHNICAL FIELD

This invention relates to a switching power supply circuit which can be incorporated as a power supply in various electronic apparatus.

BACKGROUND ART

A switching power supply circuit which adopts a switching converter in the form of, for example, a flyback converter or a forward converter is widely known. Since switching converters of the types mentioned use a signal of a rectangular waveform as a signal for a switching operation, they have a limitation to suppression of switching noise. It is also known that the switching converters have a limitation to augmentation in power conversion efficiency from their operation characteristics.

Thus, various switching power supply circuits which employ various converters of the resonance type have been proposed by the assignee of the present application. A converter of the resonance type is advantageous in that a high power conversion efficiency can be obtained readily and low noise is realized because the switching operation waveform is a sine waveform. It is advantageous also in that it can be formed from a comparatively small number of parts.

FIG. 10 shows an example of a switching power supply circuit. The switching power supply circuit shown in FIG. 10 includes a rectifier smoothing circuit for rectifying and smoothing the commercial ac power supply AC. The rectifier smoothing circuit is formed as a voltage multiplying rectifier circuit composed of a pair of rectifier diodes Di1 and Di2 and a pair of smoothing capacitors Ci1 and Ci2. The voltage multiplying rectifier circuit produces, for example, where an dc input voltage equal to a peak value of an ac input voltage VAC is represented by Ei, a dc input voltage 2Ei approximately equal to twice the dc input voltage Ei.

The reason why a voltage multiplying rectifier circuit is adopted as a rectifier smoothing circuit in this manner is that it is intended to satisfy the condition of a comparatively heavy load that the ac input voltage is AC 100 V and the maximum load power is 150 W or more.

The switching converter of the voltage resonance type shown in FIG. 10 has a self-excited construction including a single switching element Q1. In this instance, the switching element Q1 may be a high voltage withstanding bipolar transistor (BJT: junction transistor). The base of the switching element Q1 is connected to the positive electrode side of the smoothing capacitor Ci1 (rectified smoothed voltage 2Ei) through a starting resistor RS so that the base current upon starting may be obtained from the rectifier smoothing line. Further, a resonance circuit for self-excited oscillation driving is connected between the base of the switching element Q1 and the primary side ground and is formed from a series connection circuit including an inductor LB, a detection driving winding NB, a resonance capacitor CB, and a base current limiting resistor RB.

A clamp diode DD is interposed between the base of the switching element Q1 and the negative electrode (primary side ground) of the smoothing capacitors Ci and forms a path for damper current which flows when the switching element Q1 is off The collector of the switching element Q1 is connected to an end of a primary winding N1 of an insulating converter transformer PIT, and the emitter of the switching element Q1 is grounded.

A parallel resonance capacitor Cr is connected in parallel between the collector and the emitter of the switching element Q1. The parallel resonance capacitor Cr forms, based on a capacitance of the parallel resonance capacitor Cr itself and a combined inductance (L1+Lc) obtained from a series connection of a leakage inductance L1 of the primary winding N1 side of an orthogonal insulating converter transformer PRT which is hereinafter described and an inductor Lc of a choking coil PCC, a primary side parallel resonance circuit of the voltage resonance type converter. Although detailed description is omitted here, when the switching element Q1 is off, an operation of the voltage resonance type is obtained by an action of the parallel resonance circuit which causes the voltage Vcr across the parallel resonance capacitor Cr to actually exhibit a sine pulse wave.

The choking coil PCC has a transformer coupling construction of the inductor Lc and the detection driving winding NB. The detection driving winding NB excites an alternating voltage corresponding to a switching period in response to a switching output transmitted from the primary winding N1 of the orthogonal insulating converter transformer PRT to the inductor Lc.

The orthogonal insulating converter transformer PRT has a function of transmitting a switching output of the switching element Q1 to the secondary side thereof and performing constant voltage control of the secondary side output thereof The orthogonal insulating converter transformer PRT includes, for example, as shown in FIG. 11, a three dimensional core 200 which is formed such that two double channel-shaped cores 201 and 202 each having four magnetic legs are joined to each other at the ends of the magnetic legs thereof. The primary winding N1 and a secondary winding N2 are wound in the same winding direction around two predetermined ones of the magnetic legs of the three dimensional core 200 and a control winding NC is wound around two predetermined ones of the magnetic legs of the three dimensional core 200 such that the winding direction thereof is orthogonal to the primary winding N1 and the secondary winding N2, whereby the orthogonal insulating converter transformer PRT is formed as a saturable reactor. In this instance, the opposing faces of the opposing legs of the double channel-shaped cores 201 and 202 are joined together and have no gap formed therebetween. Referring back to FIG. 10, one end of the primary winding N1 of the orthogonal insulating converter transformer PRT is connected to the collector of the switching element Q1, and the other end of the primary winding N1 is connected to the positive side of the smoothing capacitors Ci (rectified smoothed voltage 2Ei) through a series connection of the inductor Lc of the choking coil PCC as shown in FIG. 10.

On the secondary side of the orthogonal insulating converter transformer PRT, an alternating voltage induced by the primary winding N1 appears in the secondary winding N2. In this instance, as a secondary side parallel resonance capacitor C2 is connected in parallel to the secondary winding N2, a parallel resonance circuit is formed from a leakage inductance L2 of the secondary winding N2 and a capacitance of the secondary side parallel resonance capacitor C2. The alternating voltage induced in the secondary winding N2 is converted into a resonance voltage by the parallel resonance circuit. In short, a voltage resonance operation is obtained on the secondary side.

In the parallel resonance circuit on the secondary side formed in such a manner as described above, center taps are provided for the secondary winding N2, and rectifier diodes D01, D02, D03 and D04 and smoothing capacitors C01 and C02 are connected in such a manner as shown in FIG. 10 to provide two full-wave rectifier circuits including a full-wave rectifier circuit including rectifier diodes D01 and D02 and smoothing capacitor C01 and another full-wave rectifier circuit including rectifier diodes D03 and D04 and smoothing capacitor C02.

The full-wave rectifier circuit composed of the rectifier diodes D01 and D02 and smoothing capacitor C01 receives a resonance voltage supplied from the secondary side parallel resonance circuit and produces a dc output voltage E01. The full-wave rectifier circuit composed of the rectifier diodes D03 and D04 and smoothing capacitor C02 similarly receives the resonance voltage supplied from the secondary side parallel resonance circuit and produces a dc output voltage E02. It is to be noted that, in this instance, the dc output voltage E01 and the dc output voltage E02 are inputted also to a control circuit 1. The control circuit 1 utilizes the dc output voltage E01 as a detection voltage and utilizes the dc output voltage E02 as an operation power supply therefor. The control circuit 1 supplies dc current, whose level thereof varies, for example, in response to the level of the dc output voltage E01 of the secondary side, to the control winding NC of the orthogonal insulating converter transformer PRT to perform constant voltage control in such a manner as hereinafter described.

Since the control winding NC is wound on the orthogonal insulating converter transformer PRT, the orthogonal insulating converter transformer PRT which acts as a saturable reactor operates so that it varies the leakage inductances (L1 and L2). While the leakage inductance L1 of the primary winding N1 forms the parallel resonance circuit of the primary side and the leakage inductance L2 of the secondary winding N2 forms the parallel resonance circuit of the secondary side as described hereinabove, both of the leakage inductances L1 and L2 are variably controlled as the control current flowing through the control winding NC varies as described above. Since the operation just described varies the resonance impedances of the primary side and the secondary side, also the switching output transmitted from the primary side to the secondary side varies, and the secondary side dc voltages (E01 and E02) are controlled to a constant voltage thereby. It is to be noted that such a constant voltage control method as just described is hereinafter referred to as "parallel resonance frequency control method".

FIG. 12 shows another example of a switching power supply circuit. Also the power supply circuit shown in FIG. 12 employs AC 100 V for a commercial power supply used, for example, in Japan or the United States, similarly to the power supply circuit described hereinabove with reference to FIG. 10, and is ready for the condition that the maximum load power is 150 W or more. Further, a self-excited converter of the voltage resonance type including a single switching element Q1 is provided on the primary side of the switching power supply circuit. It is to be noted that, in FIG. 12, like reference characters to those of FIG. 10 denote like elements and overlapping description thereof is omitted herein to avoid redundancy. Referring to FIG. 12, the switching power supply circuit shown includes an orthogonal control transformer PRT. The orthogonal control transformer PRT includes a three dimensional core 200 formed such that two double channel-shaped cores 201 and 202 each having four magnetic legs are joined to each other at the ends of the magnetic legs thereof. A controlled winding NR is wound by a predetermined number of turns around two predetermined ones of the magnetic legs of the three dimensional core 200. Further, a control winding NC is wound around two predetermined ones of the magnetic legs of the three dimensional core 200 such that the winding direction is orthogonal to the winding direction of the controlled winding NR, whereby the three dimensional core 200 is formed as a saturable reactor.

The orthogonal control transformer PRT can be regarded as a variable inductance element and can be reduced in size when compared with, for example, the orthogonal control transformer PRT described hereinabove with reference to FIG. 11. In this instance, the controlled winding NR is interposed in series between the positive electrode terminal of a smoothing capacitor Ci1 and a primary winding N1 of an insulating converter transformer PIT. Accordingly, in the power supply circuit shown in FIG. 12, a parallel resonance circuit wherein the switching operation of the primary side is of the voltage resonance type is formed by a combined inductance (L1+LR) obtained by a series connection of a leakage inductance L1 of the primary winding N1 side of the insulating converter transformer PIT and an inductance LR of the controlled winding NR and a capacitance of a parallel resonance capacitor Cr.

In the insulating converter transformer PIT shown in FIG. 12, an EE-shaped core 100 is formed from two E-shaped cores 101 and 102 made of a ferrite material, for example, in such a manner as shown in FIG. 14. In this instance, no gap is formed between the central magnetic legs of the E-shaped cores 101 and 102 as seen in FIG. 14. The primary winding N1 (and a detection driving winding NB) and the secondary winding N2 are wound in a separate condition from each other on the central magnetic legs actually using a split bobbin. Further, in the insulating converter transformer PIT, the mutual inductance M between the leakage inductance L1 of the primary winding N1 and the leakage inductance L2 of the secondary winding N2 may have a value +M (additive polarity mode) and another value −M (subtractive polarity mode) depending upon the relationship between the polarities (winding directions) of the primary winding N1 and the secondary winding N2 and the connection to the rectifier diodes D0 (D01 and D02).

The parallel resonance circuit converts the alternating voltage excited in the secondary winding N2 into a resonance voltage. The resonance voltage is supplied to two half-wave rectifier circuits including a half-wave rectifier circuit composed of a rectifier diode D01 and a smoothing capacitor C01 and another half-wave rectifier circuit composed of another rectifier diode D02 and another smoothing capacitor C02. Then, dc output voltages E01 and E02 are obtained from the two half-wave rectifier circuits.

Since the controlled winding NR forms a parallel resonance circuit for obtaining a switching operation of the voltage resonance type as described hereinabove, the resonance condition of the parallel resonance circuit varies with respect to the switching frequency which is fixed. Across the parallel connection circuit of the switching element Q1 and the parallel resonance capacitor Cr, a resonance pulse of a sine waveform appears by an action of the parallel resonance circuit in response to an off period of the switching element Q1, and the width of the resonance pulse is variably controlled by the variation of the resonance condition of the parallel resonance circuit. In short, a PWM (Pulse Width Modulation) control operation for a resonance pulse is obtained. The PWM control of the resonance pulse width is control of the off period of the switching element Q1, and this signifies, in other words, that the on period of the switching element Q1 is variably controlled in the condition that the switching frequency is fixed. As the on period of the switching element Q1 is variably controlled in this manner, the switching output which is transmitted from the primary winding N1 which forms the parallel resonance circuit to the secondary side varies, and also the output level of the dc output voltage (E01 and E02) of the secondary side varies. Consequently, the secondary side dc output voltage (E01 and E02) is controlled to a constant voltage. It is to be noted that such a constant voltage control method as just described is hereinafter referred to as "primary side voltage resonance pulse width control method".

In the switching power supply circuits having the constructions described with reference to FIGS. 10 to 15, in order to satisfy the conditions that the ac input voltage VAC is AC 100 V and the maximum load power is 150 W or more, a dc input voltage of the level of 2Ei is obtained using the voltage multiplying rectification method. Therefore, actually a resonance voltage Vcr of 1,800 V appears between the opposite ends of the switching element Q1 and the parallel resonance capacitor Cr when the switching element Q1 is off. Therefore, for the switching element Q1 and the parallel resonance capacitor Cr, it is required to use products having a withstanding property of the high voltage of 1,800 V. Accordingly, the switching element Q1 and the parallel resonance capacitor Cr have corresponding large sizes. Particularly where a product of a high voltage withstanding property is selected for the switching element Q1, since the saturation voltage VCE(SAT) is high and the storage time tSTG and the fall time tf are long while the current amplification factor hFE is low, it is difficult to set the switching frequency to a high value. As the switching frequency becomes lower, the switching loss and the drive power increase, and consequently, the power loss of the power supply circuit increases. Further, a transformer provided in the power supply circuit and capacitors provided in the driving circuit system increase in size and hence in cost, and this makes an obstacle to reduction in size and weight and reduction in cost of the circuit.

Also in any of the constant voltage control methods described hereinabove with reference to FIGS. 10 and 12, the insulating converter transformer PIT (or the orthogonal insulating converter transformer PRT) wherein the primary side and the secondary side are separate from each other has a required coupling which is obtained without a gap formed therein, and the winding (inductor) Lc of the choking coil or the controlled winding NR of the orthogonal control transformer PRT is connected in series to the primary winding N1 or the secondary winding N2. Consequently, a leakage inductance component in the power supply circuit increases. The increase of the leakage inductance component gives rise to an increase of leakage flux and may possibly have an influence on an electronic circuit and so forth on the load side. Therefore, in order to reduce the influence of leakage flux, actually a structure is adopted wherein, for example, an entire switching converter circuit is accommodated in a shield case made of aluminum and having vent holes formed therein and a connector is provided for connection to inputs and outputs of the switching converter circuit. Also this structure makes an obstacle to reduction in size and weight and reduction in cost of the circuit and increases the time required for manufacture accordingly.

DISCLOSURE OF THE INVENTION

In view of the foregoing, it is thus an object of the present invention to provide an improved switching power supply circuit.

It is a further object of the invention to provide a switching power supply circuit of the resonance type which can achieve promotion of reduction in size and weight and also in cost, augmentation in efficiency in production and augmentation in various characteristics beginning with a power conversion efficiency.

Still other objects and advantages of the invention will in part be obvious and will in part be apparent from the specification and the drawings.

In order to attain the object described above, according to the present invention, there is provided a switching power supply circuit. The switching power supply circuit includes a rectifier smoothing means for receiving a commercial ac power supply, producing a rectified smoothed voltage and outputting the rectified smoothed voltage as a dc input voltage and an insulating converter transformer for transmitting a primary side output to a secondary side where the insulating converter transformer has a gap formed therein so that a coupling which is efficient for a loose coupling is obtained. The switching power supply circuit further includes switching means including a switching element for switching the dc input voltage between on and off states so as to be outputted to a primary winding of the insulating converter transformer, a primary side parallel resonance circuit formed from a leakage inductance component from the primary winding of the insulating converter transformer and a capacitance of a parallel resonance capacitor for enabling the switching means to operate as a voltage resonance type and a secondary side series resonance circuit including a secondary side series resonance capacitor and a secondary winding of the insulating converter transformer, the capacitor connected in series to the secondary winding of the insulating converter transformer, such that a series resonance circuit is formed from a leakage inductance component of the secondary winding of the insulating converter transformer and a capacitance of the secondary side series resonance capacitor.

The switching power supply circuit further includes a dc output voltage production means for receiving an alternating voltage obtained at the secondary winding of the insulating converter transformer and performing a voltage multiplying full-wave rectification operation for the alternating voltage to produce a secondary side dc output voltage substantially equal to twice the input voltage level and a constant voltage control means for varying a switching frequency of the switching element in response to a level of the secondary side dc output voltage to perform constant voltage control of the secondary side output voltage.

The switching power supply circuit further includes a series resonance circuit formed from at least a series connection of a driving winding and a resonance capacitor. The switching power supply circuit may further include a self-excited oscillation driving circuit for driving the switching element in a self-excited manner based on a resonance output of the series resonance circuit. The constant voltage control means includes an orthogonal control transformer serving as a saturable reactor on which a detection winding and the driving winding connected in series to the primary winding of the insulating converter transformer, and a control winding whose winding direction is orthogonal to the winding directions of the detection winding and the driving winding are wound, whereby control current which is variable in response to a level of the secondary side dc output voltage is supplied to the control winding to vary the inductance of the driving winding to variably control the switching frequency. The switching means further includes a separately excited driving circuit for driving the switching element in a separately excited manner, and the constant voltage control means variably controls an on period of the switching element in response to a level of the secondary side dc output voltage while keeping an off period of the switching element fixed thereby to variably control the switching frequency.

In the switching power supply circuit, a switching converter of the voltage resonance type is provided on the primary side and the insulating converter transformer is formed such that it has a loose coupling so that operation modes (+M and −M) wherein the mutual inductance between the primary winding and the secondary winding exhibits the opposite polarities to each other may be obtained. Meanwhile, on the secondary side, the secondary side series resonance capacitor is connected in series to the secondary winding to form the series resonance circuit, and the voltage multiplying full-wave rectifier circuit is provided making use of the series resonance circuit so that a secondary side dc output voltage equal to twice an alternating voltage (excited voltage) obtained at the secondary winding may be obtained. Thus, the secondary side dc output voltage is produced by the secondary side series resonance circuit and the voltage multiplying full-wave rectifier circuit to supply power to a load. In short, the voltage multiplying full-wave rectifier circuit is provided basically on the secondary side to cope with a required load condition.

Since power is supplied to the load by the voltage multiplying full-wave rectifier circuit in such a manner as described above, the switching power supply circuit can augment an available maximum load power when compared with, for example, the conventional power supply circuits wherein an equal secondary side dc output voltage is obtained using a full-wave rectifier circuit or a half-wave rectifier circuit. Incidentally, even if, for the primary side, not a voltage multiplying rectifier circuit but an ordinary full-wave rectifier circuit for producing a rectified smoothed voltage equal to the ac input voltage level is provided, the condition described above can be satisfied sufficiently.

Further, in the switching power supply circuit, in order to perform constant voltage control for stabilizing the secondary side output voltage, the switching frequency is varied in response to the secondary side output voltage level to control the resonance impedance of the primary side parallel resonance circuit and the continuity angle of the switching element in the switching power supply circuit simultaneously with each other. Thus, augmentation of the control sensitivity is achieved by the composite control operation.

The above and other objects, features and advantages of the present invention will become apparent from the following description and the appended claims, taken in conjunction with the accompanying drawings in which like parts or elements denoted by like reference symbols.

The nature, principle and utility of the invention will become more apparent from the following detailed description when read in conjunction with the accompanying drawings in which like parts are designated by like reference numerals or characters.

BRIEF DESCRIPTION OF THE DRAWINGS

For a more complete understanding of the invention, reference is made to the following description and accompanying drawings, in which:

FIGS. 4A to 4N are waveform diagrams illustrating operation of several components of the power supply circuit of FIG. 1;

BEST MODE FOR CARRYING OUT THE INVENTION

Figure 1:
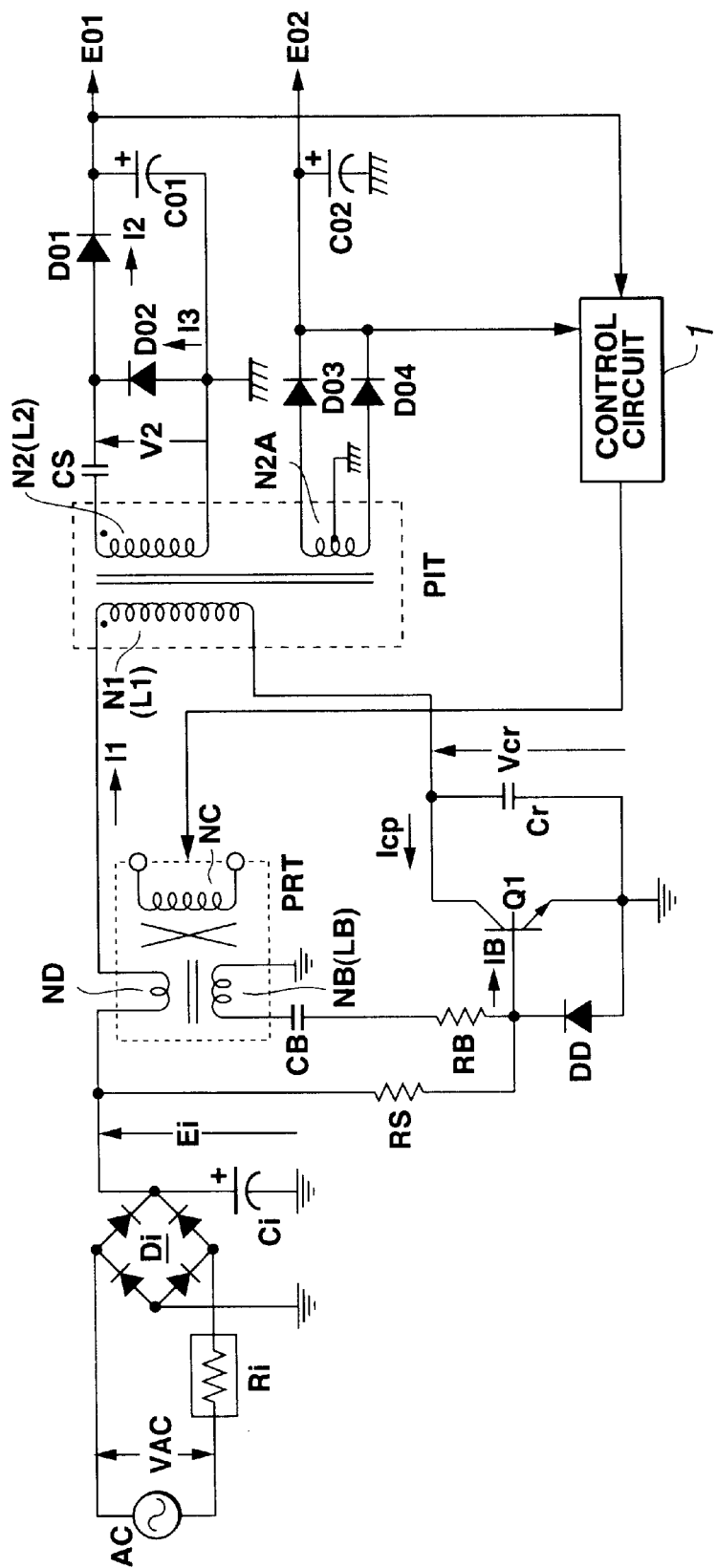
FIG. 1 is a circuit diagram showing a construction of a power supply circuit to which the present invention is applied.

The following is a detailed description of embodiments of the present invention with reference to the drawings. Referring to FIG. 1, there is shown an example of a construction of a switching power supply circuit to which the present invention is applied. In the power supply circuit shown, a self-excited switching converter of the voltage resonance type including a single switching element (bipolar transistor) is provided on the primary side. A full-wave rectifier circuit composed of a bridge rectifier circuit Di and a smoothing capacitor Ci is provided as a rectifier smoothing circuit for producing a dc input voltage from an ac input voltage, VAC, which is input thereto, and a rectified smoothed voltage Ei, equal to the level of the ac input voltage VAC, is produced. The power supply circuit does not include a voltage multiplying rectifier circuit. In the present specification, a rectifier circuit which produces a rectified smoothed voltage Ei, equal to the level of the ac input voltage VAC, like the power supply circuit of FIG. 1 is referred to as "equal voltage rectifier circuit".

Figure 2:
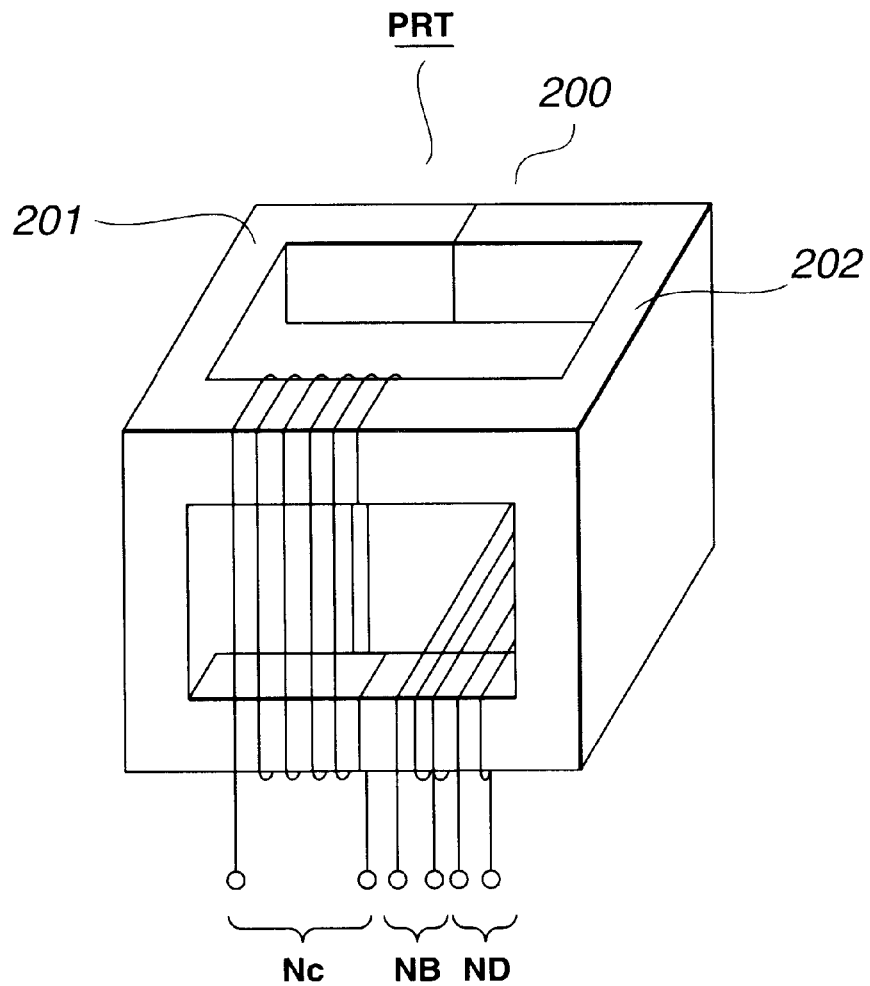
FIG. 2 is a perspective view showing a structure of an orthogonal control transformer provided in the power supply circuit of FIG. 1.

An orthogonal control transformer PRT shown in FIG. 1 is a saturable reactor including a detection winding ND, a driving winding NB and a control winding NC wound thereon. The orthogonal control transformer PRT is shown in FIG. 2. Referring to FIG. 2, the orthogonal control transformer PRT includes a three dimensional core 200 formed such that two double channel-shaped cores 201 and 202, each having four magnetic legs, are joined to each other at the ends of the magnetic legs. The detection winding ND and the driving winding NB are wound in the same winding direction around two predetermined ones of the magnetic legs of the three dimensional core 200. The control winding NC is wound in a direction orthogonal to that of the detection winding ND and the driving winding NB. The detection winding ND, driving winding NB and control winding NC have such turn numbers which are, for example, the detection winding ND=1 T (turn), driving winding NB=3 T, and control winding NC=1,000 T. The orthogonal control transformer PRT has a reduced weight, for example, of approximately 7 g.

In this instance, the detection winding ND of the orthogonal control transformer PRT is interposed in series between the positive electrode of the smoothing capacitor Ci and the primary winding N1 of the insulating converter transformer PIT so that the switching output of the switching element Q1 is transmitted to the detection winding ND through the primary winding N1. In the orthogonal control transformer PRT, the driving winding NB is excited by a switching output obtained at the detection winding ND so that an alternating voltage is generated in the driving winding NB. The alternating voltage is used as a source for a driving voltage of the self-excited oscillation driving circuit.

Further, as the control current (dc current) level which flows through the control winding NC is varied in response to a variation of the secondary side dc output voltage level by the control circuit 1, the inductance LB of the driving winding NB wound on the orthogonal control transformer PRT is variably controlled. Consequently, the resonance condition of the series resonance circuit in the self-excited oscillation driving circuit for the switching element Q1 which is formed including the inductance LB of the driving winding NB varies. This varies the switching frequency of the switching element Q1 as hereinafter described with reference to FIG. 4, and the secondary side dc output voltage is stabilized by the variation of the switching frequency of the switching element Q1.

Figure 3:
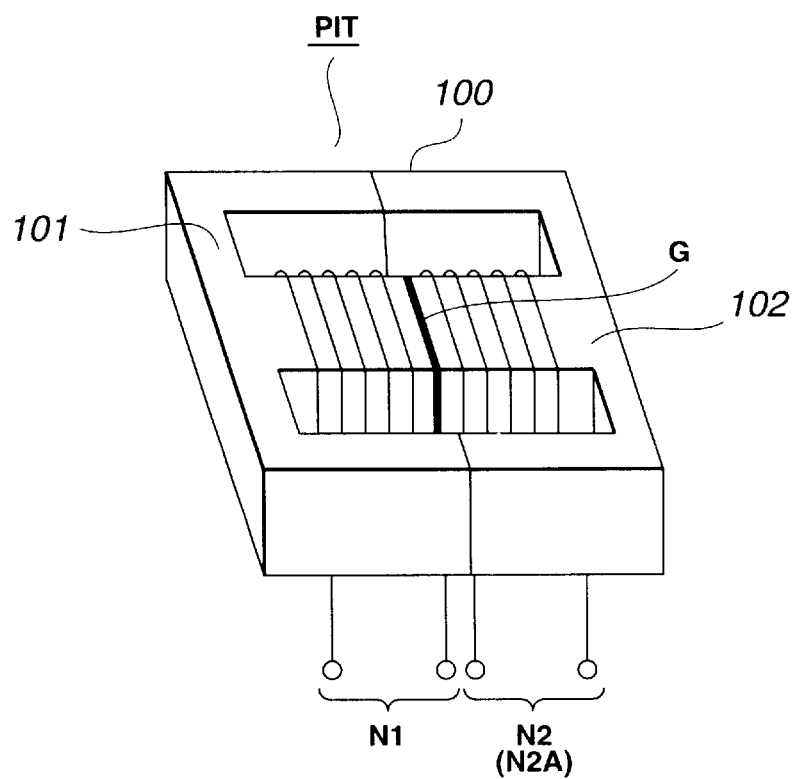
FIG. 3 is a perspective view showing a structure of an insulating converter transformer provided in the power supply circuit of FIG. 1.

Referring now to FIG. 3, the insulating converter transformer PIT of the power supply circuit of the present embodiment includes an EE-shaped core 100 which includes a pair of E-shaped cores 101 and 102 made of a ferrite material and combined to each other such that magnetic legs thereof are opposed to each other. A primary winding N1 and a secondary winding N2 (and another secondary winding N2A) are wound in a separate condition from each other on the central magnetic legs of the EE-shaped core 100 using a split bobbin whose winding portion is split for the primary side and the secondary side. A gap G is formed between the central magnetic legs of the EE-shaped core 100. The gap G can be formed by forming the central magnetic legs of the E-shaped cores 101 and 102 shorter than the other two outer magnetic legs. Consequently, a loose coupling, having a lower coupling coefficient than that in the conventional insulating converter transformer PIT is obtained, and consequently, a saturation condition is less liable to be obtained as much. The coupling coefficient k in this instance is, for example, k≅0.85.

The secondary winding N2 of the insulating converter transformer PIT of the present embodiment is wound with the number of turns different from that of the conventional power supply circuits. One end of the secondary winding N2 is connected to the secondary side ground, and the other end of the secondary winding N2 is connected through a series connection of a series resonance capacitor Cs to a junction between the anode of a rectifier diode D01 and the cathode of another rectifier diode D02. The cathode of the rectifier diode D01 is connected to the positive electrode of a smoothing capacitor C01, and the anode of the rectifier diode D02 is connected to the secondary side ground. The negative electrode side of the smoothing capacitor C01 is connected to the secondary side ground. The secondary winding N2A is wound independently of the secondary winding N2. The secondary winding N2A has a center tap connected to the ground, and a full-wave rectifier circuit composed of rectifier diodes D03 and D04 and a smoothing capacitor C02 is connected to the secondary winding N2A. The secondary winding N2A thus produces a dc output voltage E02.

In a connection as described above, a voltage multiplying full-wave rectifier circuit is composed of a set of the series resonance capacitor Cs, rectifier diodes D01 and D02, smoothing capacitor C01. The series resonance capacitor Cs forms a series resonance circuit corresponding to on/off operations of the rectifier diodes D01 and D02 depending upon the capacitance of the series resonance capacitor Cs itself and a leakage inductance component (L2) of the secondary winding N2. A parallel resonance circuit for making the switching operation a voltage resonance type switching operation is provided on the primary side, and a series resonance circuit for obtaining a voltage multiplying full-wave rectifier operation (current resonance operation) is provided on the secondary side. In the present specification, a switching converter of a construction which includes resonance circuits for both of the primary side and the secondary side in this manner is suitably referred to as "composite resonance type switching converter".

FIGS. 4A to 4N are waveform diagrams illustrating operation of the power supply circuit shown in FIG. 1. More particularly, FIGS. 4A to 4G show operation waveforms at different portions of the power supply circuit when the load power is a maximum load power (Pomax) and the ac input voltage is a minimum assurance ac input power (VACmin). FIGS. 4H to 4N show operation waveforms of the same portions as those of FIGS. 4A to 4G when the load power is a minimum load power (Pomin) and the ac input voltage is a maximum assurance ac input voltage (VACmax). In this instance, from the self-excited oscillation driving circuit for the switching element Q1, base current (driving current) IB flows to the base of the switching element Q1 as seen from FIG. 4D or 4K. The switching element Q1 performs a switching operation with the driving current IB. Thereupon, collector current Icp which flows to the collector of the switching element Q1 exhibits such a waveform as seen from FIG. 4C or 4J. A parallel resonance voltage Vcr having such a waveform as seen from FIG. 4A or 4H appears across the parallel resonance circuit of the switching element Q1 and the parallel resonance capacitor Cr by an action of the parallel resonance circuit. As seen from FIG. 4A or 4H, the parallel resonance voltage Vcr has a waveform of a pulse which exhibits the 0 level within a period TON within which the switching element Q1 is on but exhibits a waveform of a sine wave within another period TOFF within which the switching element Q1 is off, and thus exhibits an operation of the voltage resonance type.

In response to such a switching operation of the primary side as described above, a switching output is obtained at the primary winding N1. This operation is indicated as switching output current I1 obtained at the primary winding N1 of FIG. 4B or 4I. Thus, it can be seen that a smooth waveform proximate to a sine wave is obtained by the operation of the voltage resonance type. The switching output obtained on the primary side in such a manner as described above is excited in the secondary winding N2. Then, on the secondary side, a voltage multiplying full-wave rectifier operation is obtained in the following manner by the set of the [series resonance capacitor Cs, rectifier diodes D01 and D02, smoothing capacitor C01] described hereinabove.

Within a period T1 within which the rectifier diode D01 is off and the rectifier diode D02 is on, the power supply circuit operates in the subtractive polarity mode wherein the polarities of the primary winding N1 and the secondary winding N2 are −M. Consequently, by a series resonance operation of the leakage inductance L2 of the secondary winding N2 and the series resonance capacitor Cs, an operation of charging the series resonance capacitor Cs with rectifier current I3 (refer to FIG. 4F or 4M) obtained by rectifier by the rectifier diode D02 is obtained. FIGS. 4G and 4N indicate the voltage V2 across the rectifier diode D02. Then, within another period T2 within which rectifier is performed while the rectifier diode D02 is off and the rectifier diode D01 is on, the power supply circuit operates in the additive polarity mode wherein the polarities of the primary winding N1 and the secondary winding N2 are +M, and an operation of charging the smoothing capacitor C01 is performed in a condition wherein series resonance (current resonance) by which the potential of the series resonance capacitor Cs is added to the voltage induced in the secondary winding N2 occurs. At this time, rectified current I2 charged into the smoothing capacitor C01 through the rectifier diode D01 has such a waveform as shown in FIG. 4E or 4L. As can be seen from comparison of the waveform with rectified current I3 obtained by rectifier by the rectifier diode D02 shown in FIG. 4F or 4M, the rectified current I2 has an increased level from that of the rectified current I3. This arises from the fact that, in the rectifier operation, the potential of the series resonance capacitor Cs is added as described above.

As both of the additive polarity mode (+M: forward operation) and the subtractive polarity mode (−M: flyback operation) are utilized to perform a rectifier operation, a dc output voltage E01 substantially equal to twice the induced voltage of the secondary winding N2 is obtained by the smoothing capacitor C01. In short, in the power supply circuit of the present embodiment, the condition wherein the mutual inductance exhibits the two operation modes of +M and −M is utilized to perform voltage multiplying full-wave rectifier to obtain a secondary side dc output voltage, and also the power supplied to the load side increases and the maximum load power increases as much.

The construction for obtaining the voltage multiplying full-wave rectifier operation is realized by obtaining the condition wherein a saturation condition is further less liable to be entered by forming the gap G in the insulating converter transformer PIT to obtain a loose coupling of a required coupling coefficient. For example, where the gap G is not provided in the insulating converter transformer PIT as in the conventional power supply circuits, there is the possibility that, upon flyback operation, the insulating converter transformer PIT may be put into a saturation condition to cause an abnormal operation, and it is considered difficult that such a voltage multiplying rectifier operation as in the present embodiment is performed appropriately.

Further, since a voltage multiplying full-wave rectifier circuit is provided which performs a rectifier operation within two periods within which the exciting voltage of the secondary winding N2 is positive and negative as described above, in the circuit form of the present embodiment, the voltage applied to the rectifier diodes D01 and D02 which form the double voltage full-wave rectifier circuit of the secondary side is clamped to the level of the secondary side output voltage (E01) in an off state as can be seen from FIG. 4G or 4N. Consequently, where the actual dc output voltage E01 is E01=135 V, a product having a withstanding property against 150 V can be used for the rectifier diodes D01 and D02.

Further, since a secondary side dc output voltage is obtained by the voltage multiplying rectifier circuit, for example, if it is tried to obtain a level equivalent to the secondary side dc output voltage obtained, for example, by an equal voltage rectifier circuit (half-wave rectifier circuit), then the secondary winding N2 of the power supply circuit of the present embodiment can be formed with the number of turns equal to one half that of the conventional power supply circuits. The reduction in number of turns leads to reduction in size and weight and reduction in cost of the insulating converter transformer PIT. The power supply circuit of the present embodiment is formed as a switching converter of the composite resonance type which includes a converter of the voltage resonance type (parallel resonance circuit) provided on the primary side and a series resonance circuit and a voltage multiplying full-wave rectifier circuit provided on the secondary side as can be recognized from the foregoing description.

Figure 5:
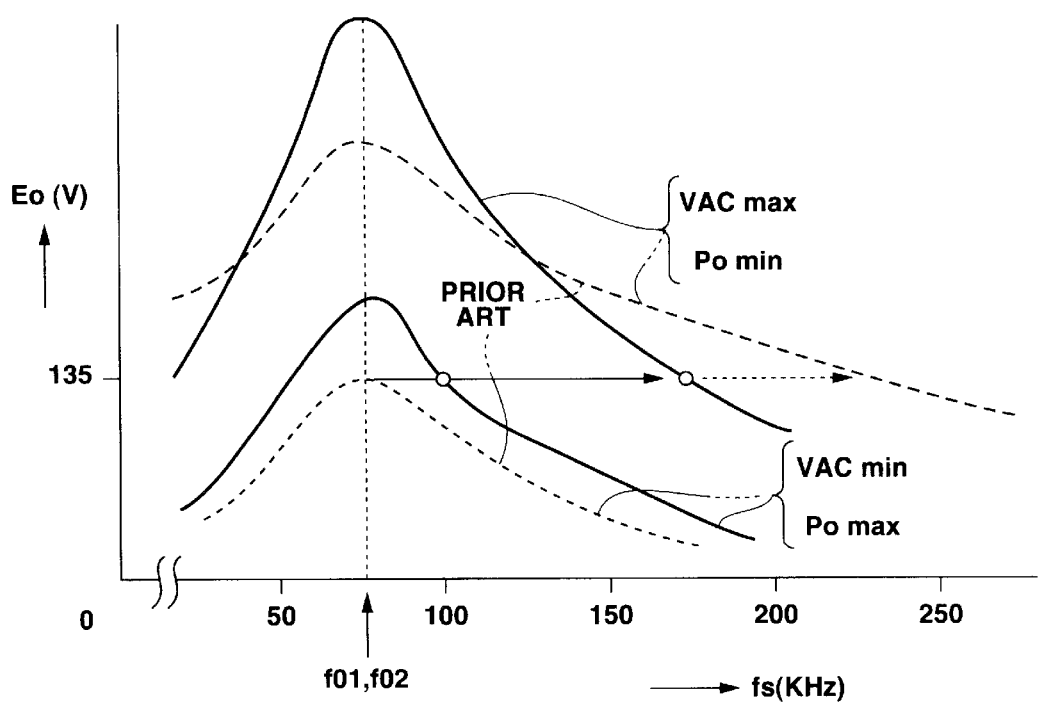
FIG. 5 is a diagram illustrating a relationship between a switching frequency and a secondary side dc output voltage of the power supply circuit of FIG. 1.
Figure 12:
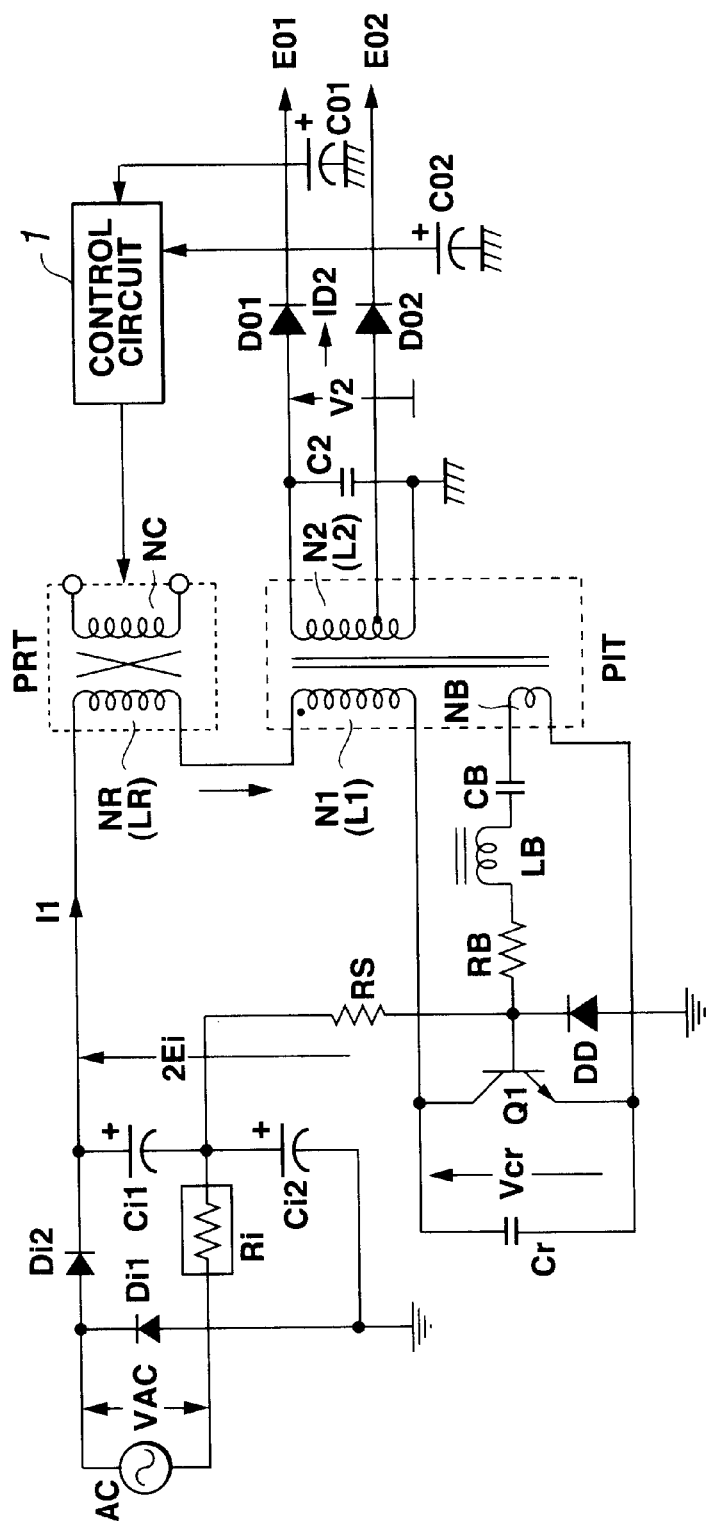
FIG. 12 is a circuit diagram showing another conventional power supply circuit.
Figure 13:
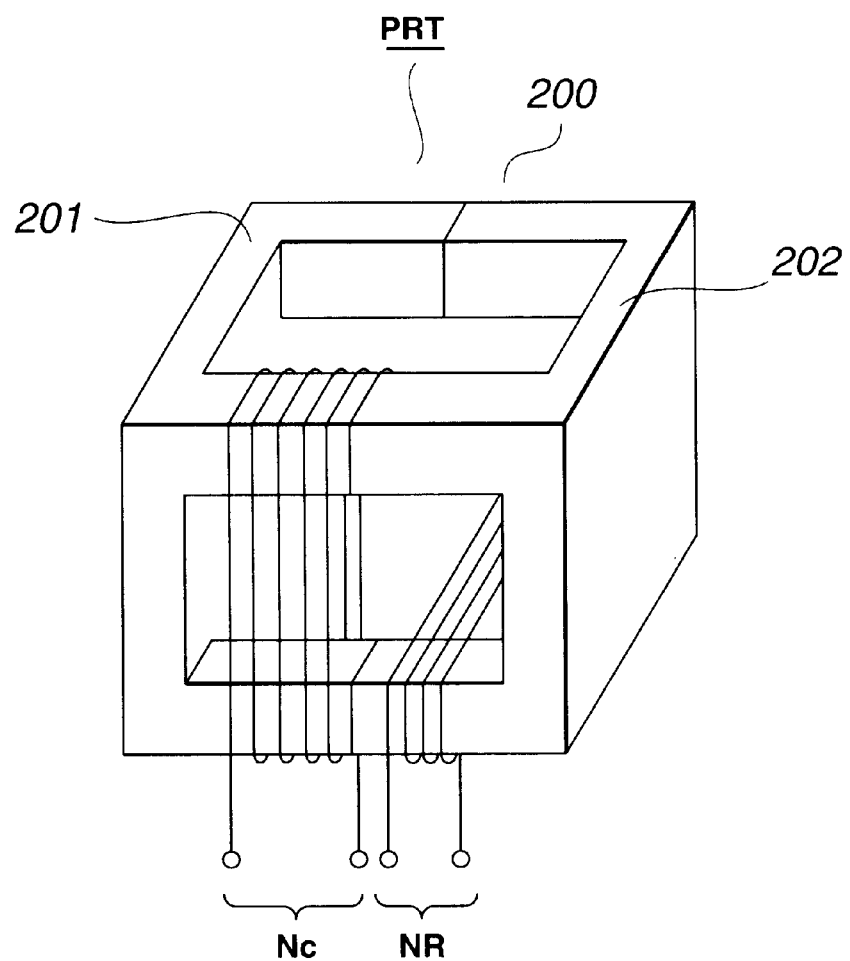
FIG. 13 is a perspective view showing a structure of an orthogonal control transformer provided in the power supply circuit of FIG. 12.
Figure 14:
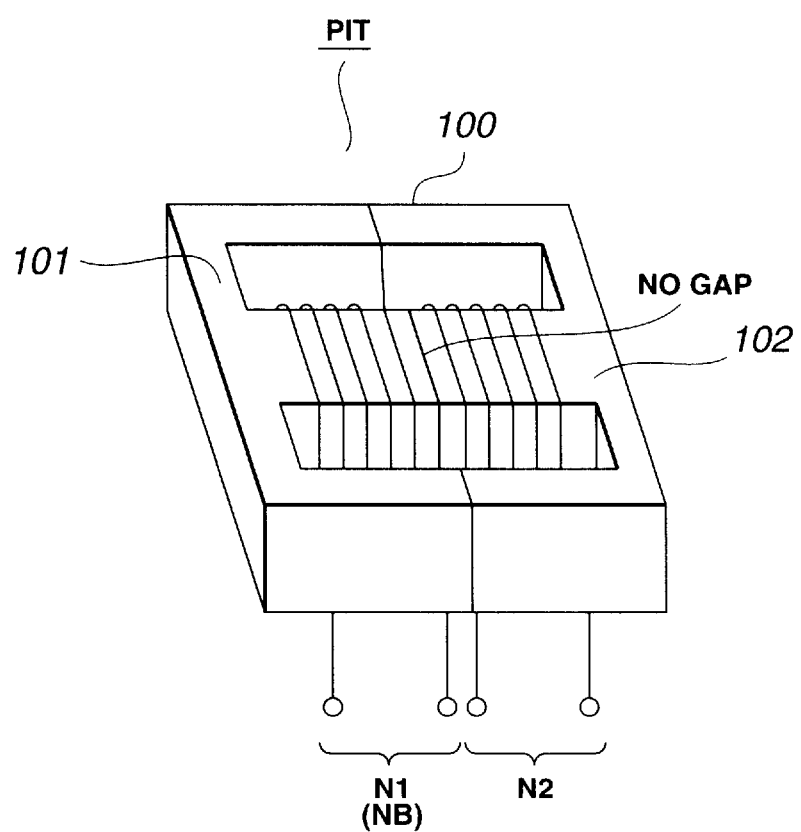
FIG. 14 is a perspective view showing a structure of an insulating converter transformer provided in the power supply circuit of FIG. 12.
Figure 15A:
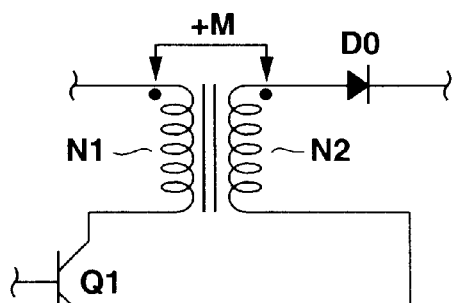
FIGS. 15A and 15B are circuit diagrams illustrating operations of the insulation converter transformer shown in FIG. 14 when the mutual inductance is +M and −M, respectively.
Figure 15B:
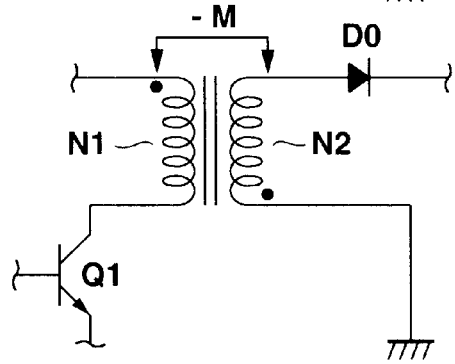

FIG. 5 illustrates a relationship between the switching frequency fs and the secondary side dc output voltage E0 (E01 and E02). In FIG. 5, the axis of abscissa indicates the switching frequency, and the axis of ordinate indicates the level of the secondary side dc output voltage E0. A resonance curve of a broken line in FIG. 5 illustrates a characteristic in the power supply circuit described hereinabove with reference to FIG. 12. As can be seen from FIG. 5, for example, in order to make the secondary side dc output voltage E0 a constant voltage so that it may be E0=135 V in response to a load variation, it is necessary to control the switching frequency fs within a range of Δ150 KHz from 75 KHz to 225 KHz. However, as described hereinabove, where the construction of the power supply circuit of FIG. 12 is used as it is, the switching frequency of the switching element Q1 has a limit approximately at 50 KHz for its voltage withstanding property. In contrast, with the circuit of FIG. 1, the switching frequency fs may be controlled within the range of Δ75 KHz from 100 KHz to 175 KHz as can be seen from a resonance curve of a solid line in FIG. 5, and this control range is approximately one half that described above. Further, as hereinafter described, in the power supply circuit of the present embodiment, increase of the switching frequency can be realized readily. The reason why the control range of the switching frequency is reduced in the power supply apparatus of the present embodiment in such a manner as described above is such as follows.

The power supply apparatus of the present embodiment has a constant voltage control action by varying the switching frequency of the switching element Q1 by an operation of the constant voltage circuit system composed of the control circuit 1 and the orthogonal control transformer as described above. This operation is illustrated also in FIGS. 4A to 4N, and as can be seen from comparison between, for example, the waveforms Vc4, ICp and IB of FIGS. 4A, 4C and 4D and FIGS. 4H, 4H and 4K, respectively, in order to vary the switching frequency, the period TOFF within which the switching element Q1 is off is fixed whereas the period TON within which the switching element Q1 is on is variably controlled. It can be considered that the power supply apparatus of the present embodiment operates, as a constant voltage control operation, to variably control the switching frequency to perform resonance impedance control for the switching output, and simultaneously performs continuity angle control (PWM control) of the switching element in a switching period. This composite control operation is realized with a single control circuit system.

The period TON in the minimum load power Pomin and maximum assurance ac input power VACmax condition to which the operation waveforms of FIGS. 4H, 4J and 4K correspond is reduced to approximately ⅓ that in the maximum load power Pomax and minimum assurance ac input voltage VACmin condition to which the operation waveforms shown in FIGS. 4A, 4C and 4D correspond. As a result, also the amount of the current I1 to flow into the voltage resonance type converter from the smoothing capacitor Ci is limited approximately to ⅓ as seen from a transition from the state of FIG. 4B to the state of FIG. 4I, and consequently, the control sensitivity is augmented and the substantial control range is expanded. Therefore, the width of variation of the switching frequency can be reduced from that in the conventional power supply circuit as described hereinabove.

In FIG. 5, the parallel resonance frequency f01 of the primary side parallel resonance circuit and the series resonance frequency f02 of the secondary side series resonance circuit are shown with respect to the switching frequency. Here, if the inductances and the capacitances are selected so that the parallel resonance frequency f01 and the series resonance frequency f02 may be equal to each other, for example, at 75 KHz as seen in FIG. 5, then the resonance impedances of them exhibit a minimized difference and the transmission efficiency from the primary side to the secondary side is maximized. Also this can augment the maximum load power with which the power supply circuit can cope.

Since increase of the maximum load power is achieved in such a manner as described above, the rectifier smoothing circuit for producing a dc input voltage in the power supply circuit of the present embodiment need not adopt a voltage multiplying rectification method to cover the load power. Therefore, as described hereinabove with reference to FIG. 1, an ordinary construction of an equal voltage rectifier circuit which employs, for example, a bridge rectifier circuit can be adopted.

Consequently, the rectified smoothed voltage Ei when, for example, the ac input voltage VAC is VAC=144 V is approximately 200 V. While the resonance voltage Vcr illustrated in FIG. 4A or 4H which appears across the parallel connection circuit of the switching element Q1 and the secondary side parallel resonance capacitor Cr is generated when the switching element Q1 is off as the primary side parallel resonance circuit acts upon the rectified smoothed voltage Ei, in the power supply circuit of the present embodiment, since the rectified smoothed voltage Ei is approximately ½ of that upon voltage multiplying rectification as described above, the resonance voltage Vcr is suppressed to approximately ½ of the resonance voltage Vcr (1,800 V) which is generated in the conventional power supply circuits described hereinabove with reference to FIGS. 10 and 12. Further, since the continuity angle of the switching element Q1 is variably controlled (PWM controlled) in such a manner as described hereinabove, the peak value of the resonance voltage Vcr is controlled so as to be substantially constant irrespective of a rise of the ac input voltage VAC. As a result, in the power supply circuit of the present embodiment, the resonance voltage Vcr is suppressed to a substantially fixed level of approximately 900 V at the peak thereof. Accordingly, in the power supply circuit of the present embodiment, products having a withstanding property of 900 V may be selected for the switching element Q1 and the parallel resonance capacitor Cr.

Since products having lower voltage withstanding properties than those in the conventional power supply circuits can be used for the switching element Q1, the parallel resonance capacitor Cr and the rectifier diodes on the secondary side in the power supply circuit of the present embodiment, the cost for the devices decreases as much. Therefore, for example, for the switching element Q1 and the bridge rectifier circuit D0, those products which have augmented characteristics can be selectively used. For example, for the switching element Q1, a product which has better characteristics in regard to the saturation voltage VCE(SAT), storage time tSTG, fall time tf, current amplification factor hFE and so forth can be selected, and for the rectifier diodes, a product which has better characteristics in regard to the forward voltage drop VF, reverse recovery time trr and so forth can be selected.

As a result of such augmentation in characteristic, the switching frequency of the power supply circuit of the present embodiment can be set higher than that of the conventional power supply circuits, and reduction of the power supply loss and reduction in size and weight of various parts can be promoted as much. In short, with the power supply circuit of the present embodiment, augmentation of various characteristics such as the power conversion efficiency from those of the conventional power supply circuits can be achieved and reduction in size, weight and cost can be achieved.

Further, from the point of view of reduction in size and weight of a power supply circuit, while such a construction which includes a voltage multiplying rectifier circuit for production of a dc input voltage as in the conventional power supply circuits requires two sets of rectifier diodes and smoothing capacitors, since the power supply circuit of the present embodiment employs a full-wave rectifier circuit which includes, for example, an ordinary bridge rectifier circuit, it can adopt a single set of a smoothing capacitor and a bridge rectifier diode of the block type, reduction of the cost and miniaturization of parts as much can be achieved.

Furthermore, since the power supply circuit of the present embodiment employs an equal voltage rectifier circuit, the number of turns of the primary winding N1 is reduced when compared with that in the conventional power supply circuits. Also this contributes to augmentation of the constant voltage control sensitivity.

Figure 10:
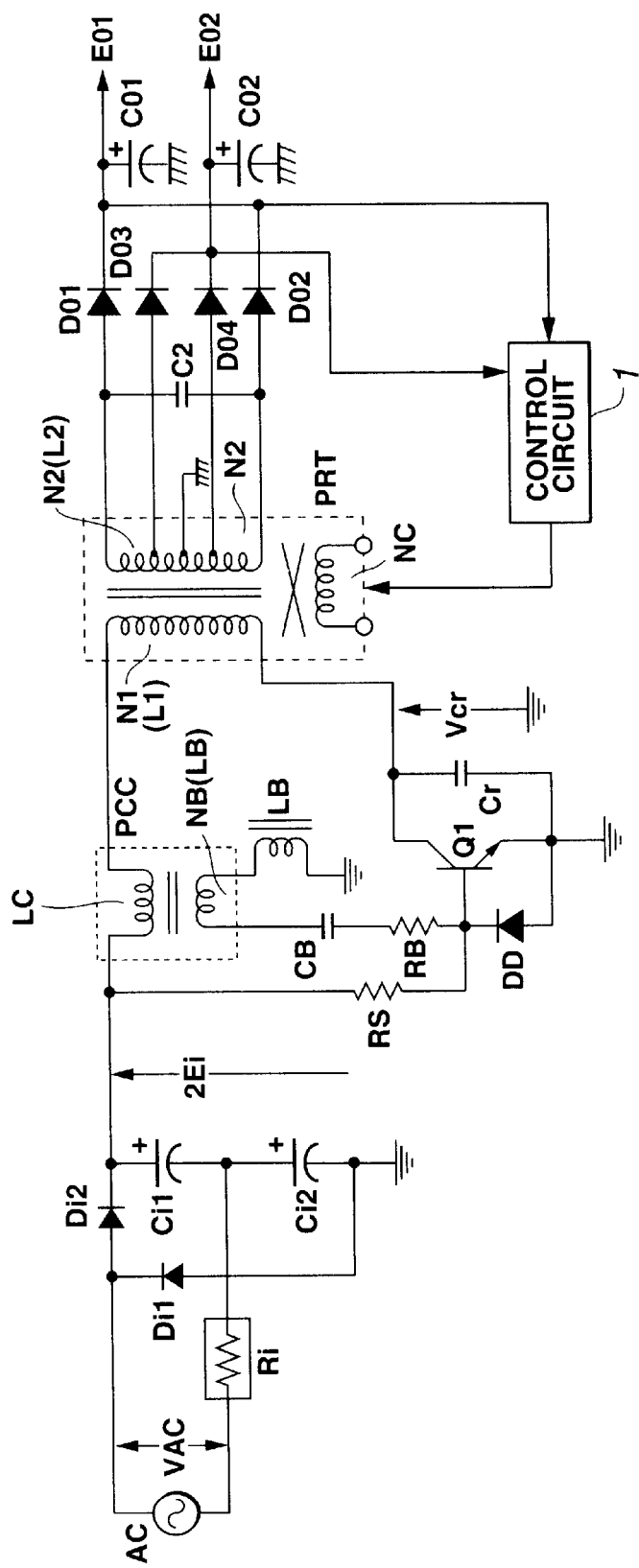
FIG. 10 is a circuit diagram showing a construction of a conventional power supply circuit.
Figure 11:
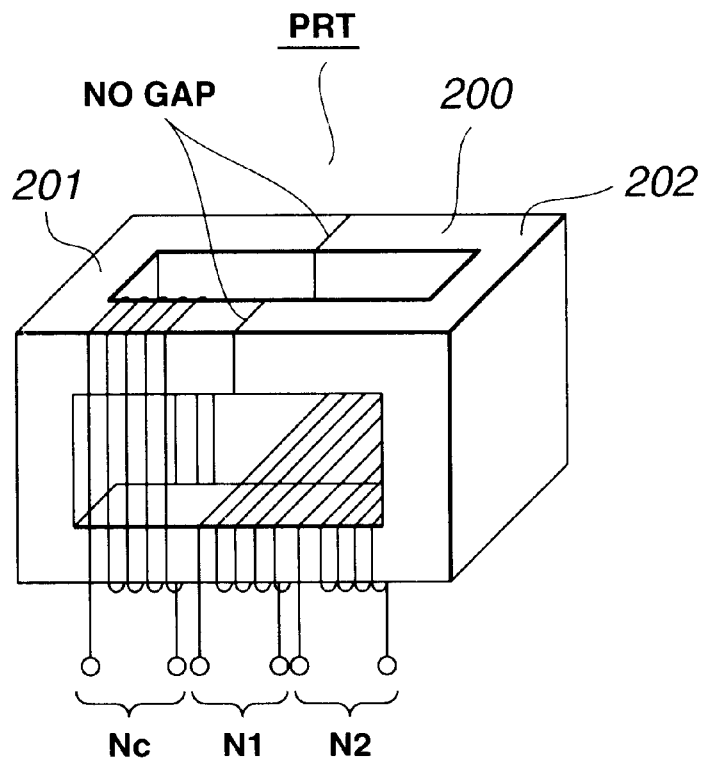
FIG. 11 is a perspective view showing a structure of an orthogonal insulating converter transformer provided in the power supply circuit of FIG. 10.

Further, while, in the power supply circuits described hereinabove with reference FIGS. 10 and 12, the inductor of the power choking coil or the controlled winding NR of the orthogonal control transformer PRT is connected in series to the primary winding N1 or the secondary winding N2, in the power supply circuit of the present embodiment, any of the windings is not connected in series to the primary winding N1 or the secondary winding N2. While, in FIG. 1, the detection winding ND is connected in series to the primary winding N1, the number of turns of the detection winding ND is, for example, 1 T, and the detection winding ND has only such an inductance value as can be ignored in terms of an effect of increasing the leakage inductance of the insulating converter transformer PIT.

Therefore, only the insulating converter transformer PIT makes the source of generation of leakage flux from the entire switching converter (power supply circuit), and as a countermeasure against leakage flux, it is sufficient, for example, only if a short ring of a copper plate is provided for the transformer body. Thus, for example, a shield case of aluminum which is required by the power supply circuit shown in FIG. 10 or 12 is not required.

For example, for the conditions that the maximum load power Pomax is 200 W and the minimum load power Pomin is 0 W and that the ac input voltage VAC has a fluctuation of 100 V±20%, where the power supply circuit shown in FIG. 1 was actually constructed such that the ferrite EE type core of the insulating converter transformer PIT is an EE 35 type core and has the gap G of 1 mm and besides the primary winding N1=50 T, secondary winding N2=25 T, parallel resonance capacitor Cr=4,700 pF and secondary side series resonance capacitor Cs=0.1 µF, stabilization of the secondary side output was achieved over the control range of the switching frequency fs=100 KHz to 250 KHz as described hereinabove with reference to FIG. 5, and under the conditions of the maximum load power Pomax=200 W and the ac input voltage VAC=100 V, a power conversion efficiency as high as 93% was obtained.

Figure 6:
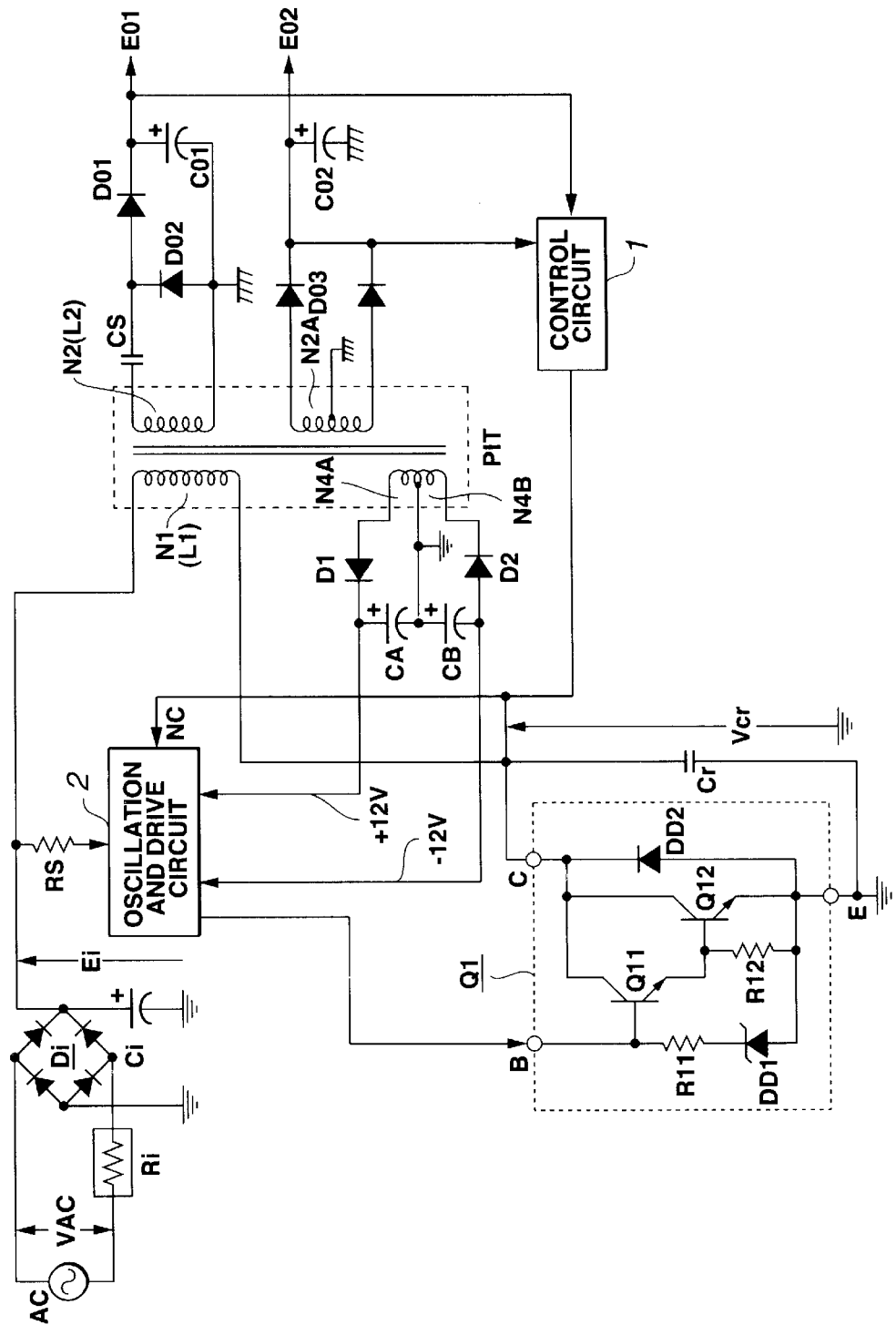
FIG. 6 is a circuit diagram showing a construction of another power supply circuit to which the present invention is applied.

FIG. 6 shows a construction of another switching power supply circuit to which the present invention is applied. It is to be noted that, in FIG. 6, like reference characters to those of FIG. 1 denote like elements and overlapping description thereof is omitted herein to avoid redundancy. Referring to FIG. 6, the power supply circuit shown includes a switching element Q1 in the form of a Darlington circuit which includes a pair of bipolar transistors (BJT) Q11 and Q12, a damper diode (Zener diode) DD1, another damper diode DD2 and a pair of resistors R11 and R12 connected in such a manner as shown in FIG. 6. In the connection of the Darlington circuit, the collector of the bipolar transistor Q11 and the collector of the bipolar transistor Q12 are connected to each other while the emitter of the bipolar transistor Q11 and the emitter of the bipolar transistor Q12 are not connected each other, and the emitter of the bipolar transistor Q12 is grounded. Further, the anode of the damper diode DD1 and the emitter of the bipolar transistor Q11 are connected to each other, and the cathode of the damper diode DD1 is connected to the base of the bipolar transistor Q11 through the resistor R11. The anode of the damper diode DD2 is connected to the emitter of the bipolar transistor Q12, and the cathode of the damper diode DD2 is connected to the collector of the bipolar transistor Q12. The resistor R12 is connected in parallel between the base and the emitter of the bipolar transistor Q12. In the Darlington circuit formed in this manner, the base of the bipolar transistor Q11 is equivalent to the base of the switching element Q1 described hereinabove in connection with the power supply circuit of the embodiment of FIG. 1, and the collector junction of the bipolar transistors Q11 and Q12 is equivalent to the collector of the switching element Q1. Further, the emitter of the bipolar transistor Q12 is equivalent to the emitter of the switching element Q1.

The power supply circuit is constructed such that the self-excited oscillation circuit for driving the switching element in a self-excited manner is omitted, and instead, an oscillation and drive circuit 2 is provided and switching driving is performed in a separately excited manner. Therefore, in the power supply circuit of the present embodiment, a pair of windings N4A and N4B are provided in the insulating converter transformer PIT. The winding N4A, a rectifier diode D1 and a capacitor CA form a half-wave rectifier circuit which produces a dc voltage of +12 V, and the other winding N4B, another rectifier diode D2 and another resonance capacitor CB form another half-wave rectifier circuit which produces a dc voltage of −12 V. The dc voltages of +12 V and −12 V are supplied as operation power supplies to the oscillation and drive circuit 2. The insulating converter transformer PIT in the power supply circuit of the present embodiment may have a structure including a core similar to that described hereinabove with reference to FIG. 3. However, the insulating converter transformer PIT in the power supply circuit of the present embodiment is different from that of the first embodiment in that the windings N4A and N4B are wound additionally on the primary side.

The oscillation and drive circuit 2 is started up by a starting resistor RS and produces an oscillation signal of a period having a required switching frequency fs. The oscillation and drive circuit 2 utilizes the operation power supplies of +12 V and −12 V to convert the oscillation signal into switching drive current, which exhibits a positive level (on) and a negative level (off) after each switching period, and outputs the switching drive current to the base terminal of the switching element Q1. Consequently, the switching element Q1 is driven to perform a switching operation with a predetermined switching frequency. Where a Darlington circuit is adopted for the switching element Q1 as in the power supply circuit of the present embodiment, a higher power conversion efficiency than that where, for example, the switching element Q1 is formed from a single bipolar transistor is obtained.

In control circuit 1 shown in FIG. 6, for example, a dc signal (detection signal) of a level varied in response to the level of the secondary side dc output voltage E01 which is a detection input is supplied to the oscillation and drive circuit 2. Here, if the oscillation and drive circuit 2 is constructed such that the on period of the switching element Q1 is variably controlled in response to a detection signal inputted from the control circuit 1 while the off period of the switching element Q1 is kept fixed to vary the switching frequency, then operation similar to that described hereinabove with reference to FIGS. 4A to 4N is obtained and similar effects to those of the power supply circuit of FIG. 1 can be obtained.

While, in the foregoing description of the power supply circuits of the embodiments of the present invention, a single bipolar transistor (BJT) or a Darlington circuit which includes two bipolar transistors is adopted as an example of the switching element Q1, such switching elements as described below may be adopted as the switching element Q1 in place of the bipolar transistor or the Darlington circuit.

Figure 7:
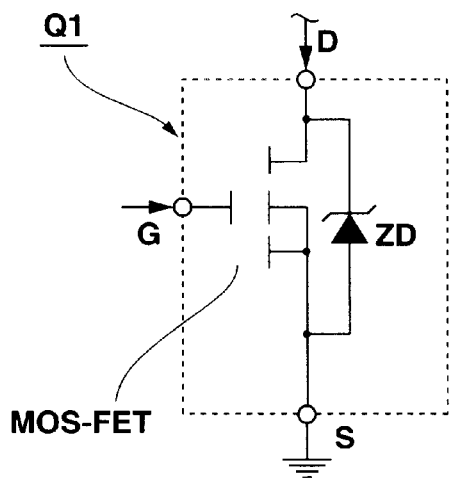
FIGS. 7 to 9 are circuit diagrams showing different circuits which can be used in place of a switching element of the power supply circuit of FIG. 1 or 6.

FIG. 7 shows the switching element Q1 for which a MOS-FET (MOS field effect transistor; metal oxide semiconductor) is used. Where a MOS-FET is used, a Zener diode ZD for forming a path for feedback current upon switching off is connected in such a direction as seen in FIG. 7 in parallel between the drain and the source of the MOS-FET. In particular, the anode of the Zener diode ZD is connected to the source of the MOS-FET, and the cathode of the Zener diode ZD is connected to the drain of the MOS-FET. In this instance, the base, collector and emitter of the switching element Q1 in the power supply circuits of the embodiments described hereinabove are replaced by the gate, drain and source of the MOS-FET, respectively.

Figure 8:
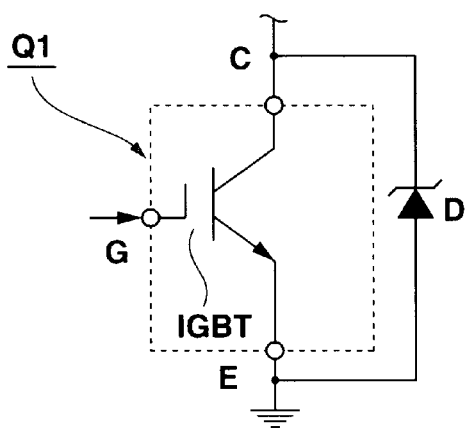

FIG. 8 shows the switching element Q1 for which an IGBT (insulated gate bipolar transistor) is used. A diode D for forming a path for feedback current upon switching off is connected in parallel between the collector and the emitter of the IGBT. Here, the anode and the cathode of the diode D are connected to the collector and the emitter of the IGBT, respectively. The base, collector and emitter of the switching element Q1 of the power supply circuits of the embodiments described above are replaced by the gate, collector and emitter of the IGBT, respectively.

Figure 9:
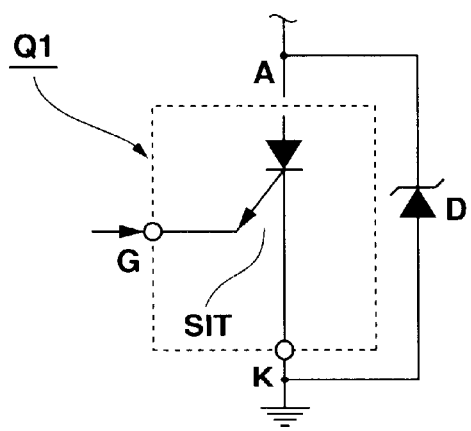

FIG. 9 shows the switching element Q1 for which a SIT (electrostatic induction thyristor) is used. A diode D for forming a path for feedback current upon switching off is connected in parallel between the collector and the emitter of the SIT. Further, the anode and the cathode of the diode D are connected to the cathode and the anode of the SIT, respectively. In the present circuit, the base, collector and emitter of the switching element Q1 of the power supply circuits of the embodiments described above are replaced by the gate, anode and cathode of the SIT, respectively. Where the structures shown in FIGS. 7 to 9 are adopted, a further high efficiency can be achieved. It is to be noted that, where the structures shown in FIGS. 7 to 9 are adopted, though not shown in the figures, the construction of the driving circuit is modified so as to conform with characteristics of an element to be adopted actually in place of the switching element Q1. For example, the driving circuit preferably has a separately excited configuration so that a stable operation may be anticipated. For example, where the MOS-FET shown in FIG. 7 is used, the driving circuit should be constructed so as to be driven with a voltage in a separately excited manner.

While preferred embodiments of the present invention have been described using specific terms, such description is for illustrative purposes only, and it is to be understood that changes and variations may be made without departing from the spirit or scope of the following claims.

Industrial Applicability

As described above, a switching power supply circuit according to the present invention includes a rectifier smoothing circuit and an insulating converter transformer for transmitting a primary side output to a secondary side where the insulating converter transformer has a gap formed therein so that a coupling which is efficient for a loose coupling is obtained. The switching power supply circuit further includes switching circuit including a switching element for switching the dc input voltage between on and off states so as to be outputted to a primary winding of the insulating converter transformer, a primary side parallel resonance circuit formed from a leakage inductance component from the primary winding of the insulating converter transformer and a capacitance of a parallel resonance capacitor for enabling the switching means to operate as a voltage resonance type and a secondary side series resonance circuit including a secondary side series resonance capacitor and a secondary winding of the insulating converter transformer. The switching power supply circuit further includes a dc output voltage production means for receiving an alternating voltage obtained at the secondary winding of the insulating converter transformer and performing a voltage multiplying full-wave rectification operation for the alternating voltage to produce a secondary side dc output voltage substantially equal to twice the input voltage level and a constant voltage control means for varying a switching frequency of the switching element in response to a level of the secondary side dc output voltage to perform constant voltage control of the secondary side output voltage.

For example, in order for the conventional switching power supply circuits to cope with the condition described above, a rectified smoothed voltage equal to twice the ac input voltage level must be obtained using a voltage multiplying rectifier circuit. Therefore, for the switching element and the parallel resonance capacity on the primary side, products having a voltage withstanding property against a switching voltage generated in response to the rectified smoothed voltage level must be selected.

Further, in the conventional switching power supply circuits, where they are constructed such that a dc output voltage is produced by a half-wave rectifier circuit on the secondary side, since a voltage as high as approximately 2.5 to 3.5 times the rectified smoothed voltage is applied within an off period of the rectifier diode, products having a voltage withstanding property against this voltage level are selectively used.

In contrast, with the switching power supply circuit of the present invention, since the switching voltage which relies upon the rectified smoothed voltage level is ½ that of the conventional switching power supply circuits, products having a voltage withstanding property as high as ½ that of the conventional switching power supply circuits can be used for the switching element and the resonance capacitor on the primary side.

Further, on the secondary side, while the voltage multiplying full-wave rectifier circuit is provided as described above, since the voltage multiplying full-wave rectifier circuit performs a full-wave rectifier operation wherein rectifier operation is performed within both of periods within which the alternating voltage is positive and negative, the voltage to be applied to the rectifier diode is suppressed to a level substantially equal to the rectified smoothed voltage level. Therefore, a product having a lower voltage withstanding property than ever can be selectively used for the secondary side rectifier diode.

Consequently, the cost required for the switching element, the parallel resonance capacitor on the primary side, the secondary side rectifier diode and so forth can be reduced first. Further, it is readily possible to selectively use a switching element and a secondary side rectifier diode of improved characteristics to set the switching frequency to a high level, and augmentation of the power conversion efficiency can be achieved thereby. Further, also it is possible to achieve reduction in size and weight of circuit parts around the switching element.

Furthermore, since the circuit for obtaining a rectified smoothed voltage from a commercial ac power supply is an ordinary equal voltage rectifier circuit, an ordinary set of a smoothing capacitor and a bridge rectifier diode of the block type can be adopted. Consequently, reduction in cost and reduction in circuit scale can be achieved also in this regard. Further, the number of turns of a controlled winding is reduced, and also reduction in size and weight and reduction in cost of an orthogonal control transformer to be used for constant voltage control can be achieved.

Further, since a voltage multiplying full-wave rectifier circuit is adopted for the rectifier circuit provided on the secondary side, if it is tried to make a dc output voltage equal in level to that where, for example, an equal voltage rectifier circuit is provided, then the number of turns of the secondary winding can be reduced approximately to one half that in the conventional switching power supply circuits.

Furthermore, since the switching frequency is varied to compositely control the resonance impedance of the switching output and the continuity angle of the switching element so that constant voltage control may be performed, the control sensitivity is augmented and the controllable range is expanded, and consequently, stabilization of the secondary side output voltage can be realized within a control range of the switching frequency narrower than ever. Such reduction of the control range of the switching frequency contributes also to reduction of the number of turns to be wound on any transformer included in the power supply circuit and to miniaturization of various parts.

Further, in the constant voltage control circuit of the switching power supply circuit, irrespective of whether the circuit system for driving the switching element is of the self-excited type or the separately excited type, an inductance element such as the choking coil or a controlled winding of the orthogonal control transformer is not connected in series to the primary winding or the secondary winding. Therefore, since appearance of leakage flux in the power supply circuit is limited only to the insulating converter transformer, there is no necessity of covering over the power supply circuit with a shield case as in the conventional power supply circuit, and leakage flux can be eliminated, for example, only by providing a short ring of a copper plate. This contributes to reduction in size and weight and reduction in cost of the power supply circuit itself, and also reduction of the time required for production can be achieved.

The switching element may be formed from a Darlington circuit which includes a bipolar transistor, a MOS field effect transistor, an insulated gate bipolar transistor or an electrostatic induction thyristor. In this instance, the power conversion efficiency can be further augmented than where the switching element is formed from, for example, a single bipolar transistor.

In this manner, with the switching power supply circuit of the present invention wherein a voltage resonance type converter is provided on the primary side, reduction in cost, reduction in size and weight and augmentation of various characteristics such as a power conversion efficiency are promoted.

What is claimed is:

1. A switching power supply circuit, comprising:

rectifier smoothing means for receiving a commercial ac power supply, producing a rectified smoothed voltage and outputting said rectified smoothed voltage as a dc voltage;

an insulating converter transformer for transmitting a primary side output to a secondary side, said insulating converter transformer having a gap formed therein so that a coupling which is efficient for a loose coupling is obtained;

switching means including a switching element for switching the dc input voltage between on and off states so as to be outputted to a primary winding of said insulating converter transformer;

a primary side parallel resonance circuit formed from a leakage inductance component from said primary winding of said insulating converter transformer and a capacitance of a parallel resonance capacitor for enabling said switching means to operate as a voltage resonance type;

a secondary side series resonance circuit including a secondary side series resonance capacitor and a secondary winding of said insulating converter transformer, said capacitor connected in series to said secondary winding of said insulating converter transformer, such that a series resonance circuit is formed from a leakage inductance component of said secondary winding of said insulating converter transformer and a capacitance of said secondary side series resonance capacitor;

dc output voltage production means for receiving an alternating voltage obtained at said secondary winding of said insulating converter transformer and performing a voltage multiplying full-wave rectification operation for the alternating voltage to produce a secondary side dc output voltage substantially equal to twice the input voltage level; and constant voltage control means for varying a switching frequency of said switching element in response to a level of the secondary side dc output voltage to perform constant voltage control of the secondary side output voltage.

2. A switching power supply circuit according to claim 1, wherein said switching means further includes a series resonance circuit formed from at least a series connection of a driving winding and a resonance capacitor.

3. A switching power supply circuit according to claim 2, and further comprising a self-excited oscillation driving circuit for driving said switching element in a self-excited manner based on a resonance output of said series resonance circuit.

4. A switching power supply circuit according to claim 3, wherein said constant voltage control means includes:

an orthogonal control transformer serving as a saturable reactor on which a detection winding and said driving winding connected in series to said primary winding of said insulating converter transformer, and a control winding whose winding direction is orthogonal to the winding directions of said detection winding and said driving winding are wound, whereby control current which is variable in response to a level of the secondary side dc output voltage is supplied to said control winding to vary the inductance of said driving winding to variably control the switching frequency.

5. A switching power supply circuit according to claim 1, wherein said switching means further includes a separately excited driving circuit for driving said switching element in a separately excited manner, and said constant voltage control means variably controls an on period of said switching element in response to a level of the secondary side dc output voltage while keeping an off period of said switching element fixed thereby to variably control the switching frequency.

6. A switching power supply circuit according to claim 1, wherein said switching means includes a Darlington circuit which includes a bipolar transistor as said switching element.

7. A switching power supply circuit according to claim 1, wherein said switching means includes a MOS field effect transistor as said switching element.

8. A switching power supply circuit according to claim 1, wherein said switching means includes an insulated gate bipolar transistor as said switching element.

9. A switching power supply circuit according to claim 1, wherein said switching means includes an electrostatic induction thyristor as said switching element.

* * * * *